Sept. 22, 1964        R. J. BROADWELL        3,149,830
SELF-DAMPING SUSPENSION UNIT
Filed Nov. 16, 1962        2 Sheets-Sheet 1
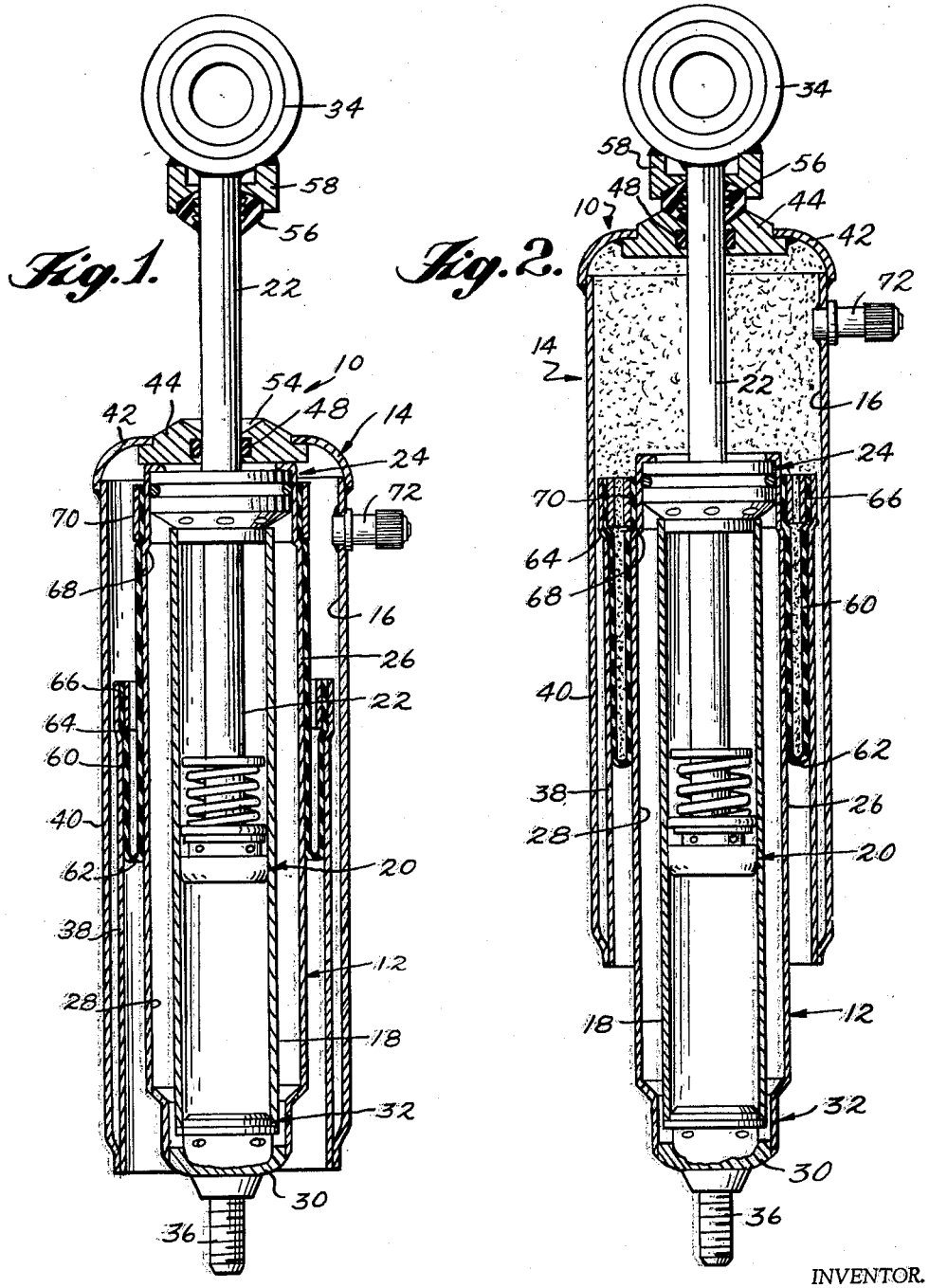
INVENTOR.
ROBERT J. BROADWELL
BY
Cushman, Darby & Cushman
ATTORNEYS

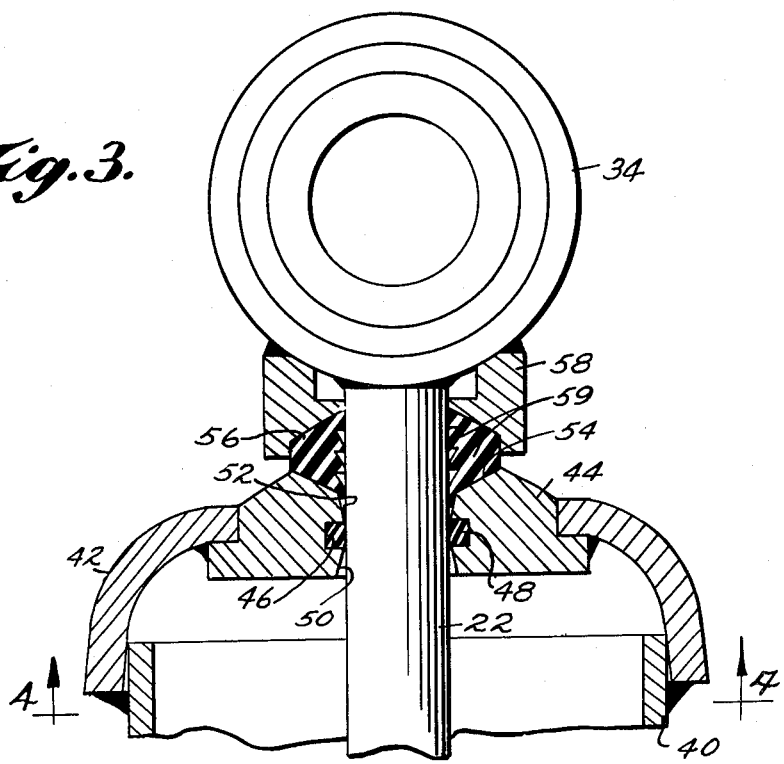
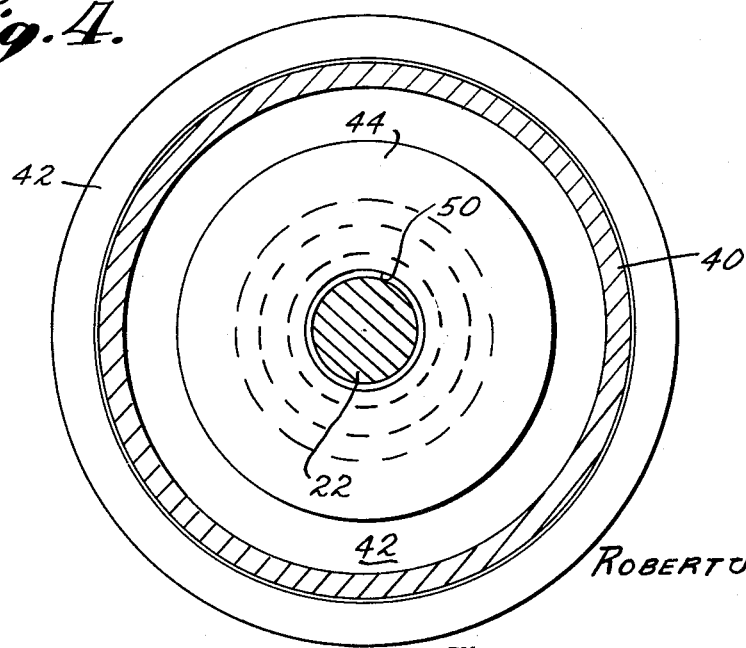

United States Patent Office 3,149,830
Patented Sept. 22, 1964

3,149,830
SELF-DAMPING SUSPENSION UNIT
Robert J. Broadwell, Cleveland, Ohio, assignor, by mesne assignments, to Maremont Corporation, Chicago, Ill., a corporation of Illinois
Filed Nov. 16, 1962, Ser. No. 238,243
7 Claims. (Cl. 267—64)

This invention relates to vehicle suspensions and more particularly to load supporting damper units of the type disclosed in my co-pending application Serial No. 190,106, filed April 25, 1962, of which the present application constitutes a continuation-in-part. The present invention also constitutes an improvement of the collapsible air chamber suspension unit disclosed in commonly assigned application Serial No. 238,200, filed concurrently herewith in the name of Joseph Vernon Baum.

A unit of the type disclosed in the Broadwell application consists essentially of a conventional piston and cylinder type shock absorber and an outer tubular part or member connected with the outwardly extending end of the piston rod of the shock absorber and disposed in surrounding relation with the cylinder of the shock absorber. A folded rolling seal is provided between the outer tubular member and the outer tubular member of the shock absorber so as to define therewith an air chamber capable of supporting a portion of the load of the sprung mass of the vehicle on the unsprung mass thereof.

While the above-mentioned folded rolling seal has proven to be quite effective in operation, some problems have arisen where units of this type have been stored for a period of time prior to use. In operation the folded rolling seal is adapted to engage between spaced annular surfaces, the outer fold of the seal engaging an interior annular surface and the inner fold of the seal engaging an inwardly spaced exterior annular surface. Normally, the seal is constructed in sleeve or tubular form having a constant diameter, this diameter being intermediate the diameters of the exterior and interior fold engaging surfaces. In operation the outer fold of the sleeve seal will therefore be in tension having expanded from its normal intermediate diameter to the larger diameter of the outer interior surface. Conversely, the inner fold of the seal will be in compression having decreased in diameter from its normal diameter to the smaller diameter of the inner exterior annular surface.

Where a unit of this type is stored for a period of time under some air pressure without being used, there is a tendency for the folded portions of the sleeve to assume a permanent set condition in their expanded or contracted position as the case may be. After such a condition has taken place in the sleeve seal and the unit is put into operation the rolling action of the seal becomes initially more difficult due to the set condition and creases may occur in the expanded portion of the seal which ultimately develop into leaks, resulting in failure of the load carrying ability of the unit.

The above condition can be substantially eliminated by exhausting the air pressure from the air chamber to atmosphere so that the folded portions of the seal are not forced to assume an expanded or contracted position where a permanent set condition can take place. However, operation of the unit without pressure in the air chamber would result in serious damage to the seal since without pressure in the air chamber a proper rolling action is prevented causing the seal to fold on itself thus resulting in ultimate destruction. Even if a lubricant, such as silicon fluid, is added to the air chamber to alleviate such doubling action continued recycling will ultimately result in failure.

Because of the situation indicated above a manufacturer of the units, if they are to be shipped without air pressure in the air chamber, must rely upon the individuals responsible for installing the units on the vehicle to supply the air chamber with air pressure during installation. Experience has shown that a fair percentage of such individuals will not carry out this responsibility so that there will always be a percentage of the units manufactured which will not give satisfactory performance.

For this reason it is preferable to ship the units with at least some pressure in the air chamber so as to relieve the individuals who will install the units of the responsibility of introducing air pressure into the air chamber before any substantial use of the unit takes place. Where the units are shipped with air pressure in the chamber the possibility of failure because of the set condition of the seal, as previously mentioned, exists. In addition, where an air pressure is contained within the air chamber the unit will be normally urged into an expanded condition and unless some packaging device is utilized to lock the unit in its contracted position (which device adds to the cost involved) the storage space of the packaged units is substantially increased.

In addition to the installation problems noted above, there is also presented the possibility of damaging the folded rolling seal of a unit after installation if for some reason the air pressure leading to the unit is lost. For example, in many installations the air chambers of two units mounted on the vehicle are interconnected by a conduit system. A failure in the conduit system causing the pressure in the air chambers of the units to reduce to atmospheric pressure would likewise result in failure of the seals of the units if operated with the air chambers under such reduced pressure conditions.

The above difficulties are largely overcome by the structure disclosed in the above mentioned Baum application wherein the parts defining the air chamber are mounted for relative movement with respect to each other from an inoperative position when the air chamber is exhausted to atmosphere wherein the air chamber defining parts will be substantially free from any relative movement in response to relative movement of the shock absorber parts into an operative position in response to the introduction of air under pressure into the air chamber wherein the air chamber defining parts are movable relative to each other to vary the volume of the air chamber in response to the relative movement between the shock absorber parts.

In order to accomplish this result the suspension unit disclosed in the Baum application includes the provision of two new elements in addition to the piston elements provided in the suspension unit disclosed in my earlier application, namely, an inner tubular element forming one of the air chamber defining parts and a coil spring for effecting movement of the inner tubular element into its inoperative position.

An object of the present invention is the provision of a suspension unit of the type described which obtains all of the advantages of the Baum structure without the necessity of adding additional parts.

A further problem which is encountered in the operation of a suspension unit of the type described in my earlier copending application is that when torque forces are applied to the telescopic parts of the unit due to their connection with the vehicle parts, such torque forces will be transmitted to the air chamber defining parts between which folded rolling seal acts, thus resulting in the seal engaging surfaces being disposed in eccentric relation with respect to each other. Under these conditions the fold in the seal will be detrimentally affected possibly to the extent of forming slight creases in the seal which ultimately lead to leakage. It can be seen that where the seal engaging surfaces are disposed eccentrically with respect to each other, a portion of the fold may become excessively sharp while the diametrically opposed portion will become excessively rounded. It is at these excessively sharp points where failure may occur.

Accordingly, it is a further object of the present invention to provide a suspension unit of the type described which, in operative position, includes a torque insulator means for preventing the transmission of operative torque forces to the parts of the unit between which the folded rolling seal acts so that these parts will be maintained in concentric relation under substantially all operative conditions even those conditions where torque forces are applied by the vehicle to the unit.

Still another object of the present invention is the provision of a load absorbing damper unit of the type described which is simple in construction, economical to manufacture, simple to install and efficient in operation.

These and other objects of the present invention will become more apparent during the course of the following detailed description and appended claims.

The invention may best be understood with reference to the accompanying drawings wherein an illustrative embodiment is shown.

In the drawings:

FIGURE 1 is a vertical sectional view of a self damping suspension unit embodying the principles of the present invention and showing the parts in their inoperative position;

FIGURE 2 is a view similar to FIGURE 1 showing the parts in their operative position;

FIGURE 3 is an enlarged fragmentary vertical sectional view of the upper portion of the structure shown in FIGURE 2; and FIGURE 4 is a sectional view taken along the line 4—4 of FIGURE 3.

Referring now more particularly to the drawings, there is shown in FIGURES 1 and 2 a self damping suspension unit or load supporting damper unit, generally indicated at 10, which embodies the principles of the present invention. The basic components of the unit 10 include a conventional piston and cylinder type shock absorber, generally indicated at 12, and a plurality of suspension parts, generally indicated at 14, defining a load supporting air chamber 16 adjacent the upper portion of the shock absorber 12.

The shock absorber 12 may be of any suitable construction. A specific example of such a construction is illustrated in detail in my above-mentioned co-pending application. Preferably, as shown in the drawings, the shock absorber 12 includes an interior cylinder or cylindrical member 18 having a piston assembly 20 reciprocably mounted therein. While the details of construction of the piston assembly are not shown in the drawings, it will be understood that appropriate restricted orifices are provided by the assembly to permit passage of hydraulic fluid within the cylinder 18 from the upper portion thereof to the lower portion thereof, and vice versa. Connected with the piston assembly 20 and extending upwardly from there is a piston rod member 22. The piston rod extends outwardly of the cylinder 18 through a sealing assembly, generally indicated at 24. Here again, the details of construction of the sealing assembly have not been illustrated in the drawings since they may be of any conventional construction. Again, reference may be made to my co-pending application for any constructional details. For present purposes it is sufficient to note that the assembly 24 provides a seal for the upper end of the cylinder 18 and about the periphery of the piston rod 22.

The shock absorber 12 also includes a tubular element 26 which is disposed in surrounding relation to the cylinder 18 and defines therewith an annular replenishing chamber 28. The upper end of the tubular element 26 is bent over and secured to the sealing assembly 24 and the lower end thereof is secured to an end closure member 30 which is also secured to the lower end of the cylinder member 18. The end closure 30 includes a base valve assembly 32 of conventional construction (see my above-mentioned co-pending application for details) which includes a valved orifice permitting passage of hydraulic fluid from the lower end of the cylinder into the replenishing chamber 28 and a replenishing valve permitting passage of fluid from the replenishing chamber to the lower end of the cylinder. This movement of hydraulic fluid to and from the replenishing chamber through the valve assembly 32 is, in accordance with conventional practice, necessary because of the piston rod displacement in the upper portion of the cylinder. Insofar as the operation of the shock absorber 12 is concerned, it is entirely conventional except insofar as it cooperates with the suspension parts 14 to form a device capable of supporting load as well as damping.

The present unit is adapted to be connected between the sprung and unsprung masses of a vehicle in a manner similar to a conventional shock absorber. To this end, any of the well-known types of connector elements may be utilized. As shown, a ring or eye-type connector 34 is rigidly secured, as by welding or the like, to the upper end of the piston rod 22. The lower connector shown is a stud connector 36 of a conventional design rigidly secured to the end closure 30 and extending downwardly therefrom.

The tubular element 26 which forms an outer part of the shock absorber 12, also functions as an inner suspension part. The suspension parts 14 also include an outer part which preferably is made up of an inner tubular element 38 welded or otherwise fixedly and sealingly secured at its lower end to the lower end of an outer tubular element 40. The upper end of the outer tubular element 40 is, in turn, welded or otherwise fixedly and sealingly secured to the outer periphery of a dish-shaped ring member 42. The inner periphery of the ring member 42 is secured, as by welding or the like, to the outer periphery of a closure member 44.

As best shown in FIGURE 3, the closure member 44 is provided with a central opening through which the piston rod 22 extends, the opening having a centrally located annular groove 46 formed therein. Mounted within the groove 46 is an O-ring seal 48 of conventional design arranged to sealingly engage the peripheral surface of the piston rod 22. The central opening in the closure member 44 flares outwardly and downwardly from the groove 46, as indicated at 50. The portion of the opening extending upwardly from the groove 46 flares upwardly and outwardly, as indicated at 52, and terminates in a shallow frusto-conical seal engaging surface 54. The surface 54 of the end closure member 44 is adapted to engage a cooperating surface of a resilient sealing member 56 mounted in a seal retaining member 58 rigidly secured to the ring connector 34. As best shown in FIGURE 3, the sealing member 56 has its upper exterior periphery shaped to engage within a correspondingly shaped recess in the retaining member 58 and has a plurality of flexible lips 59 formed on its interior periphery for engaging the exterior periphery of the piston rod.

Mounted between the tubular element parts 26 and 38 is a folded rolling seal 60. The seal 60 is preferably made of a suitable flexible material which has a considerable resistance to expansion or compression, such as a woven sleeve of fibrous material imbedded within a molded or extruded plastic or rubber material. Preferably, the sleeve is molded with a normal diameter of a size intermediate the diameter size of the tubular element 26 and the diameter size of the tubular element 38. The sleeve is mounted between the tubular element parts by folding the same upon itself so as to provide a fold indicated at 62, intermediate the ends thereof which divide the sleeve into an outer folded portion and an inner folded portion.

The end of the sleeve seal 60 associated with the outer folded portion is fixedly secured to the interior surface of the tubular element 38 adjacent to and above an annular shoulder 64 formed in the upper end portion thereof. Any suitable means may be provided to effect the securement of the sleeve end to the tubular element 30, such as a ring 66 of metal or the like suitably expanded to grip the end of the sleeve between the exterior surface thereof and the adjacent interior surface of the tubular element 38. It will be noted that the portion of the tubular element 38 extending below the shoulder 64 provides an interior annular or peripheral surface for engaging the outer folded portion of the seal 60.

The end of the sleeve seal associated with the inner folded portion thereof is fixedly secured to the tubular element 26 adjacent to and above a shoulder 68 formed therein at a position spaced just below the upper sealing assembly 24. As shown, a ring 70 of metal or the like, is preferably utilized to effect securement of the seal to the tubular element 26, the ring 70 being compressed into engagement with the end of the seal so as to grip the latter between the interior surface of the ring and the adjacent exterior surface of the tubular element 26. The portion of the element 26 extending below the shoulder 68 provides a smooth exterior peripheral surface for engaging the inner folded portion of the sleeve seal 60.

In order to introduce and maintain air under pressure within the air chamber 16, there is provided a conventional tire valve 72 which is suitably mounted in the upper portion of the tubular element 40. The tire valve is of conventional construction and therefore the internal working parts thereof have not been illustrated in the drawings. It will be understood that the valve includes the usual check valve member which is normally spring pressed to prevent the air in the air chamber 16 from communicating with the atmosphere. This check valve member may be removed to permit free communication between the air chamber 16 and the atmosphere and when properly installed is capable of being opened by a conventional filling station type air hose so as to permit air under pressure from the hose to pass into the air chamber 16.

*Operation*

The unit 10 of the present invention will normally be packaged and stored in a completely collapsed condition. In such position, the check valve member of the tire valve 72 is loosened or removed so as to permit free communication of the air chamber 16 to the atmosphere. The suspension parts 14 of the units are disposed in the position shown in FIGURE 1. In the stored position, the piston assembly 20 would normally be disposed in its lowermost position within the cylinder 18. With the suspension parts in the stored or inoperative position shown in FIGURE 1, it will be noted that a reciprocable movement of the piston rod 22 can be effected without effecting any movement between the inner and outer tubular elements 26 and 28 of the suspension parts 14. This action is possible because the frictional drag of the folded rolling seal 60 is greater than the frictional drag between the periphery of the piston rod and the O-ring seal 48. Thus, when the suspension parts are in their inoperative position with the air chamber 16 exhausted to atmosphere, relative movement between the shock absorber parts will not effect a movement of the folded rolling seal because the suspension parts, between which the folded rolling seal is mounted, are effectively coupled with only one of the shock absorber parts, namely the tubular element 26.

It can be seen that the unit 10 may be easily installed with the suspension parts disposed in their inoperative position by simply extending the piston rod the desired amount to correspond with the connecting elements on the vehicle. Again, it will be noted that such movement will not result in the movement of the folded rolling seal nor would such movement of the folded rolling seal occur after installation in the event that the vehicle is operated prior to the introduction of air under pressure into the air chamber 16.

Installation of the present unit is completed after the connectors 34 and 36 have been attached to the vehicle by supplying air into the air chamber 16 by means of a conventional tire hose engaged with the tire valve 72. It will be noted that the O-ring seal 48 effectively seals the air chamber 16 so that as air under pressure enters the air chamber the outer suspension part including the end closure member 44, the ring member 42, and tubular elements 40 and 38 will move upwardly from the position shown in FIGURE 1 to the position shown in FIGURE 2. In the operative position shown in FIGURES 2 and 3, the seal engaging surface 54 of the end closure will have engaged the resilient seal 56. The O-ring seal is, under ordinary circumstances, sufficient to prevent leakage of air from the air chamber 16 when the parts are in their operative position. However, it will be noted that the resilient seal 56 provides an additional seal which increases in effectiveness in response to the increase in pressure within the air chamber 16. That is, the greater the pressure within the air chamber the greater compression will be applied to the resilient seal 56 and the greater the compression in the seal the greater the sealing effect.

It can thus be seen that the suspension parts 14 of the unit 10 are operable to move from their inoperative position as shown in FIGURE 1 to their operative position shown in FIGURE 2 in response to the introduction of air under pressure into the air chamber 16. Whereas the suspension parts 14 are effectively connected with only one of the relative movable parts of the shock absorber assembly 12 in their inoperative position; in their operative positions, the suspension parts will have relative movement with respect to each other to vary the volume within the air chamber in response to relative movements between the shock absorber parts.

A significant feature of the present construction is that the resilient seal 56 provides, in conjunction with the flaring end closure surfaces 48 and 50, a torque interrupter which prevents torque forces applied to the ring connector 34 from being transferred to the tubular element 38. If the tubular element 38 were rigidly secured to the upper end of the piston rod 22, a torque force applied to the upper end of the piston rod would tend to move the lower end of the tubular element 38 into an eccentric position with respect to the tubular element 26. With the torque interrupting function of the resilient seal 56 of the present construction, the folded rolling seal engaging surfaces will be maintained in concentric relation thus eliminating the possibility of damage to the folded rolling seal which can occur when the supporting surfaces are positioned eccentrically with respect to each other.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. A suspension unit adapted to be connected between the sprung mass and unsprung mass of a vehicle comprising a pair of parts mounted for relative movement toward and away from each other, a folded rolling seal mounted between said parts and defining therewith an air chamber, means communicating with said air chamber providing for the introduction and exhaust of air under pressure into and out of said air chamber, one of said parts having means fixed with respect thereto for connecting said one part with one of said masses for movement in response to the movement of said one mass, a member having means for connecting the same to the other of said masses for movement therewith in response to the movement of said other mass, said member including abutment means adjacent said connecting means and a cylindrical surface extending from said abutment means in a direction generally toward the connecting means of said one part, the other of said parts including a portion slidably sealingly engaging said cylindrical surface, said other part being mounted for relative movement with respect to said one part and said member from an inoperative position wherein said air chamber is exhausted and said portion is disposed away from said abutment means and is free from relative movement with respect to said one part in response to relative movement between said one part and said member into an operative position in response to the introduction of air under pressure into said air chamber wherein said portion is disposed in engagement with said abutment means and said parts are movable telescopically to vary the volume of said air chamber in response to relative movements between said connecting means.

2. A self-damping suspension unit adapted to be connected between the sprung mass and unsprung mass of a vehicle comprising a shock absorber including an outer tubular element having means fixed on one end thereof for connection with one of said masses so that said tubular element will move with said one mass and a piston rod reciprocably mounted with respect to said tubular element and extending outwardly from the opposite end thereof, means fixed on the outer extremity of said piston rod for connection with the other of said masses so that said piston rod will move with said other mass, a rigid element fixed with respect to said piston rod adjacent the connection means thereon, a resilient member carried by said rigid element in surrounding relation to said piston rod, a tubular suspension part mounted for telescopic movement with respect to said outer tubular element, a folded rolling seal between said outer tubular element and said tubular suspension part and defining therewith an air suspension chamber, means communicating with said air chamber providing for the introduction and exhaust of air under pressure into and out of said air chamber, said tubular suspension part including an end portion having a central opening therein receiving said piston rod, said end portion being urged into sealing engagement with said resilient member when said air chamber contains air under pressure, the engagement of said end portion with said resilient member and the shape of the opening in said end portion being such as to permit limited relative angular movement between said piston rod and said tubular suspension part so that torque forces transmitted to said connection means by the sprung and unsprung masses when said unit is connected therebetween will not result in a relative angular displacement between said outer tubular element and said tubular suspension part.

3. A self-damping suspension unit as defined in claim 2 wherein said end portion is mounted for sliding movement with respect to said piston rod between the operative position of engagement with said resilient member and an inoperative position adjacent the piston rod end of said outer tubular element, and annular sealing means carried by said end portion and engaging the exterior periphery thereof for permitting reciprocating movements of said piston rod relative to said suspension part and said tubular element together when said air chamber is exhausted to atmosphere and for effecting movement of said end portion from said inoperative position to said operative position in response to the introduction of air under pressure into said air chamber.

4. A self-damping suspension unit adapted to be connected between the sprung mass and unsprung mass of a vehicle comprising a tubular element, a cylinder within said tubular element and defining therewith an annular replenishing chamber, a piston slidably mounted within said cylinder, a piston rod connected at one end with said piston for movement therewith and extending outwardly from one end of said cylinder, means for permitting controlled flow of hydraulic fluid into the piston rod end of said cylinder and said replenishing chamber and out of the opposite end of said cylinder in resopnse to the movement of said piston within said cylinder in a direction toward the opposite end of the latter and for permitting controlled flow of hydraulic fluid out of the piston rod end of said cylinder and said replenishing chamber and into the opposite end of said cylinder in response to the movement of said piston within said cylinder in a direction toward the piston rod end of the latter, means on the outwardly extending end of said piston rod for connecting the same to one of said masses, means for connecting the opposite end of said cylinder to the other of said masses, abutment means connected with said piston rod adjacent the associated connecting means between the latter and the piston rod end of said cylinder, a suspension part mounted on said piston rod for movement therealong between said abutment means and the piston rod end of said cylinder, a folded rolling seal connected between said tubular element and said suspension part and defining therewith an air chamber, means communicating with said air chamber providing for the introduction and exhaust of air under pressure into and out of said air chamber, and means providing a sliding seal between said suspension part and the exterior periphery of said piston rod for permitting reciprocating movement of said piston rod with respect to said suspension part when said air chamber is exhausted to atmosphere so as to prevent rolling movement of said folded seal in response to such reciprocating movement of said piston rod and for effecting movement of said suspension part into engagement with said abutment means in response to the introduction of air under pressure into said air chamber to thereby cause said suspension part to move with said piston rod and hence effect a rolling movement of said folded seal in response to the reciprocating movement of said piston rod.

5. A self-damping suspension unit as defined in claim 4 wherein said abutment means includes a rigid seal retaining member fixed with respect to said piston rod and a resilient sealing member carried by said seal retaining member in a position to be engaged by said suspension part.

6. A self-damping suspension unit as defined in claim 4 wherein said suspension part includes an end portion having a central opening therein receiving said piston rod, said opening having an annular groove formed in the central portion thereof, said seal providing means comprising an O-ring seal mounted in said groove in sealing engagement with the periphery of said piston rod, said opening flaring outwardly from said groove toward the ends thereof.

7. A self-damping suspension unit as defined in claim 4 wherein said suspension part comprises an end closure portion having a central opening therein receiving said piston rod and a tubular portion disposed in surrounding relation to said tubular element, said tubular portion and said tubular element having opposed interior and exterior peripheral surfaces respectively each receiving a folded portion of said folded rolling seal.

References Cited in the file of this patent
UNITED STATES PATENTS 2,980,411    Timpner et al. _____ Apr. 18, 1961
3,063,702    Long _____ Nov. 13, 1962